United States Patent [19]

Zhang et al.

[11] Patent Number: 5,635,151
[45] Date of Patent: Jun. 3, 1997

[54] CARBON ELECTRODE MATERIALS FOR LITHIUM BATTERY CELLS AND METHOD OF MAKING SAME

[75] Inventors: Jinshan Zhang, Duluth; Anaba A. Anani, Norcross, both of Ga.

[73] Assignee: Motorola, Inc., Schaumburg, Ill.

[21] Appl. No.: 561,641

[22] Filed: Nov. 22, 1995

[51] Int. Cl.$^6$ .................................................. C01B 31/00
[52] U.S. Cl. .................... 423/445 R; 423/448; 423/460; 423/449.6
[58] Field of Search ............................ 423/445 R, 448, 423/460, 449.6

[56] References Cited

U.S. PATENT DOCUMENTS

| | | | |
|---|---|---|---|
| 5,219,680 | 6/1993 | Fauteux | 429/218 |
| 5,378,561 | 1/1995 | Furukawa et al. | 429/218 |

*Primary Examiner*—Bruce F. Bell
*Attorney, Agent, or Firm*—Kenneth M. Massaroni

[57] ABSTRACT

A method for preparing an amorphous carbon material for use as an electrode, such as the anode of an electrochemical cell. The amorphous carbon is fabricated in a one heating step process from multi-functional organic monomers. The material is then reheated in the presence of a lithium salt such as $LiNO_3$, $Li_3PO_4$ or $LiOH$. Electrodes so fabricated may be incorporated into electrochemical cells (10) as the anode (20) thereof.

15 Claims, 6 Drawing Sheets

CARBON ELECTRODE MATERIALS FOR LITHIUM BATTERY CELLS AND METHOD OF MAKING SAME

CROSS REFERENCE TO RELATED APPLICATIONS

This application is related to U.S. Ser. No. 08/534,427, filed Sep. 27, 1995, in the names of Zhang, et al, and assigned to Motorola, Inc., the disclosure of which is incorporated herein by reference.

TECHNICAL FIELD

This invention relates in general to the field of electrodes and materials for electrochemical cells, and in particular to methods of synthesizing said electrodes and materials.

BACKGROUND OF THE INVENTION

As electronic devices and other electrical apparatuses increasingly become portable, advances must be made in energy storage systems to enable such portability. Indeed, it is often the case with current electronics technology that the limiting factor to portability of a given device is the size and weight of the associated energy storage device. Obviously, a small energy storage device may be fabricated for a given electrical device, but at the cost of energy capacity. Conversely, a long-lasting energy source can be built, but it is then too large to be comfortably portable. The result is that the energy source is either too bulky, too heavy, or it doesn't last long enough. The main energy storage device used for portable electronics is the electrochemical battery cell, and less frequently, the electrochemical capacitor.

Numerous different battery systems have been proposed for use over the years. Early rechargeable battery systems included lead-acid, and nickel-cadmium (Nicad), each of which have enjoyed considerable success in the marketplace. Lead-acid batteries, because of their ruggedness and durability, have been the battery of choice in automotive and heavy industrial applications. Conversely, Nicads have been preferred for smaller or portable applications. More recently, nickel metal hydride systems (NiMH) have found increasing acceptance for both large and small applications.

Notwithstanding the success of the aforementioned battery systems, other new batteries are appearing on the horizon which offer the promise of better capacity, better power density, and longer cycle life as compared with the current state of the art. The first such system to reach the market is the Lithium ion battery, which is already finding its way into consumer products. Lithium polymer batteries are also receiving considerable attention, though have not yet reach the market.

Lithium batteries in general include a positive electrode fabricated of a transition metal oxide material, and a negative electrode fabricated of an activated carbon material such as graphite or petroleum coke. New materials for both electrodes have been investigated intensely because of their high potential gravimetric energy density. To date, however, most of the attention has been focused on the transition metal oxide electrode.

Activated carbon materials are routinely prepared by using difunctional monomers as polymer precursors. Examples of such precursors include resins of furfuryl alcohol, phenol, formaldehyde, acetone-furfural, or furfural alcohol-phenol copolymer. Other precursors include polyacrylonitrile and rayon polymers, as disclosed in Jenkins, et al, *Polymeric Carbons-Carbon Fibre, Glass and Char*, Cambridge University Press, Cambridge, England (1976). These precursors are then subjected to a process of curing and carbonizing, usually very slowly, and at temperatures of up to 2,000° C. Two major steps are involved in these processes: (1) synthesis of polymer precursors from difunctional monomers via wet chemistry; and (2) pyrolysis of the precursors. The method typically results in a relatively low overall yield due to the two step process. For example, conventional processing of polyacrylonitrile typically yields only about 10% of a usable carbonaceous material. Further, many impurities may be incorporated into the carbonaceous material, deleteriously effecting the electrochemical properties.

Accordingly, there exists a need for an improved, carbon material for use in electrochemical cell applications. The material should be easily manufactured in a simple, high yield method.

DETAILED DESCRIPTION OF THE PREFERRED EMBODIMENT

Figure 1:
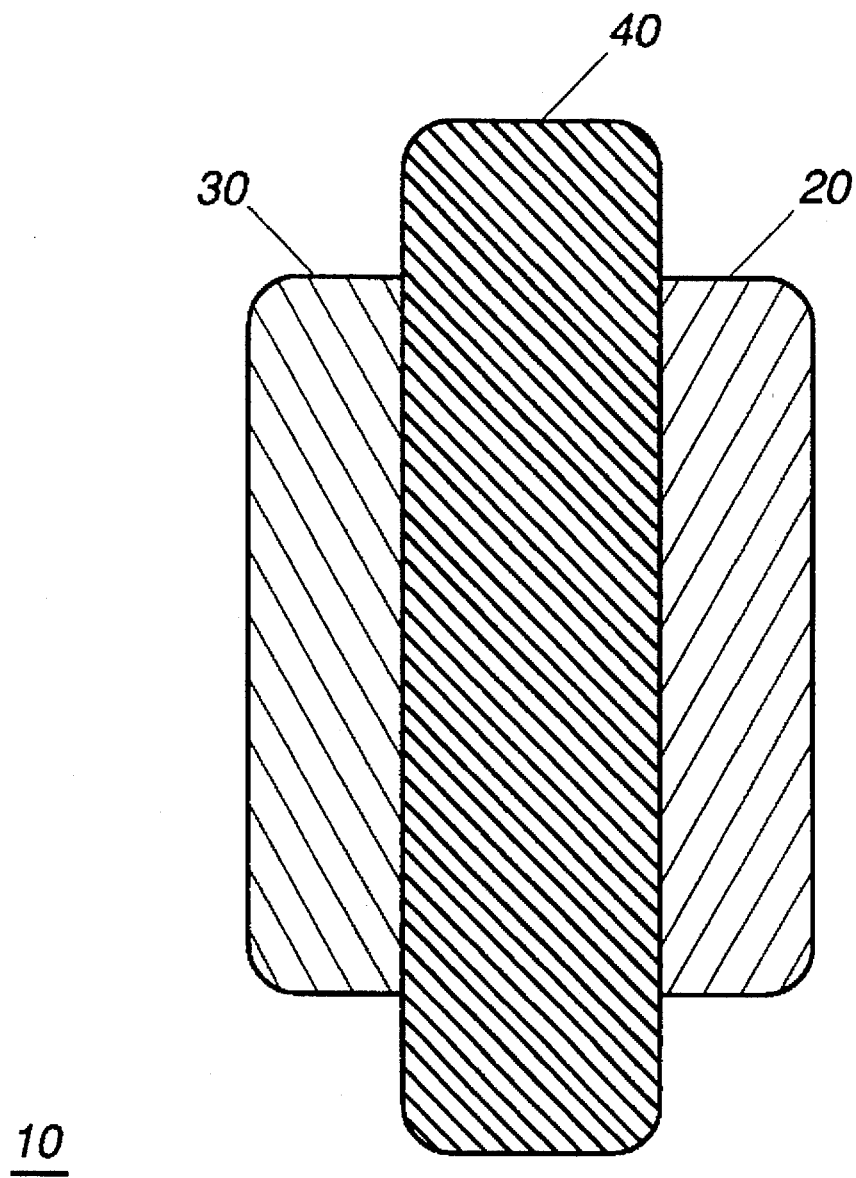
FIG. 1 is a schematic representation of an electrochemical cell including an electrode fabricated of an amorphous carbon material, in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell 10 such as a battery or an electrochemical capacitor, and including a carbon-based or amorphous carbon electrode fabricated in accordance with the instant invention. The electrochemical cell includes a positive electrode or cathode 20, a negative electrode or anode 30 and an electrolyte 40 disposed therebetween. The cell negative electrode 30 is fabricated of an amorphous carbon or carbon-based material such as that described in greater detail hereinbelow. The positive electrode 20 of the cell 10 may be fabricated from a lithiated transition metal oxide such as are well known in the art. Alternatively, the positive electrode material may be fabricated of a material such as that described in commonly assigned, co-pending patent application Ser. No. 08/464,440 filed Jun. 5, 1995, in the name of Mao, et al, and entitled "Positive Electrode Materials for Rechargeable Electrochemical Cells and Method of Making Same", the disclosure of which is incorporated herein by reference.

The electrolyte 40 disposed between the electrodes may be any of the electrolytes known in the art including, for example, $LiClO_4$ in propylene carbonate, or polyethylene oxide impregnated with a lithiated salt. The electrolyte 40 may also act as a separator between the positive and negative electrodes. The electrolyte may be aqueous, non-aqueous, solid state, gel, or some combination thereof.

In accordance with the instant invention, there is provided an amorphous carbon or carbon-based material for use as an electrode in an electrochemical device such as a battery, and a method for making acid material. The carbon-based materials are substantially amorphous, though may be partially or completely crystalline or include crystalline inclusions if desired, and may include an amount of one or more modifiers. The exact nature of the modifiers is dependent upon the specific application contemplated.

Instead of the difunctional monomer precursors used in the prior art, the instant invention uses multi-functional organic monomers, each having at least three functional groups of two kinds. More specifically, the multi-functional organic monomers have the general formula of:

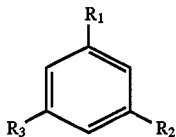

wherein $R_1$, $R_2$, and $R_3$ are each a functional group, and are all selected from the group consisting of carboxylic acids of eight carbons or less, carboxylic esters of eight carbons or less, alcohols of eight carbons or less, carboxylic anhydrides of eight carbons or less, amines, and combinations thereof, and wherein at least one of $R_1$, $R_2$, and $R_3$ is different than the others. In one preferred embodiment, at least one functional group is a carboxylic ester. It is also to be noted that in the fabrication process of the materials described below, differing functional groups may in fact react with one another.

In one preferred embodiment, the multi-functional organic monomer is selected from the group consisting of 5-hydroxyisophthalic acid, 5-aminoisophthalic acid, α-resorcyclic acid, β-resorcyclic acid, δ-resorcyclic acid, gentisic acid, protocatechuic acid, and combinations thereof. In another particularly preferred embodiment, the multi-functional organic monomer is α-resorcyclic acid. While preferred multi-functional organic monomers are recited above, it is to be noted that the instant invention is not so limited. Indeed, many other organic monomers may be employed equally advantageously.

With respect to the fabrication of carbon electrode materials, it has been found that when the organic monomer is heated in the presence of an acid, the reaction of the monomer is more complete, and results in an improved yield of the final product. Hence, the amorphous carbon material may be formed with an acid present. Examples of acids preferred include acids selected from the group consisting of acetic acid, boric acid, phosphoric acid, p-toluenesulfonic acid, 4-amino benzoic acid, trifluoroacetic acid, and combinations thereof. It is hypothesized that the acids are acting as catalysts in the ester condensation reaction of the organic monomer. The acid may be present in amounts between 1 and 25% weight percent. While preparation of the material is preferably carried out in the presence of an acid as described, such materials may be fabricated without the acid, with the result being lower overall yields of the final product.

In the preparation of the amorphous carbon material, it is contemplated that the monomer is heated, along with the acid catalyst, in an inert environment. Preferred inert environments include, for example, nitrogen, argon, and helium. The materials are heated at temperatures sufficient to induce a solid state carbonization of the multi-functional monomers. This process is similar in nature to a sublimation process, and occurs at temperatures of less than about 1200° C., and preferably about 600° C.

The method of the instant invention incorporates the step of polymerization and carbonization of the materials into a single process, in solid state. The multi-functional monomers described hereinabove polymerize at lower temperatures. Once polymerized, the multi-functional monomers form a hyperbranched polymer which subsequently carbonizes at slightly higher temperatures to form the amorphous carbon material. As the multi-functional organic monomers generally contain the elements of carbon, hydrogen, oxygen, and nitrogen in varying combinations, the carbonization process refers to the fact that the organic precursor decomposes, evolving compounds including carbon-oxygen, carbon-hydrogen, hydrogen-oxygen, nitrogen-hydrogen, and other similar compounds. The remaining carbon atoms condense into planar structures terminating predominantly with edge hydrogen atoms, the amount of hydrogen atoms depending upon the temperature of the initial part of the carbonization process.

The one-step polymerization/carbonization of the multi-functional monomer can be understood from the following diagram which illustrates the reaction mechanism for the polymerization/carbonization. The reaction involves an initial state, an intermediate state, and the final product. In the initial state, the multi-functional monomer, for example, α-resorcyclic acid, is heated at relatively low temperatures, i.e., temperatures up to about 500° C., which results in the condensation of the monomer and driving off of water vapor. This phase of the reaction is illustrated by the following formula:

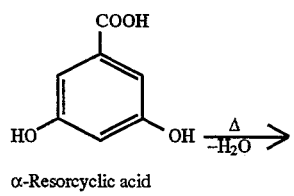

α-Resorcyclic acid

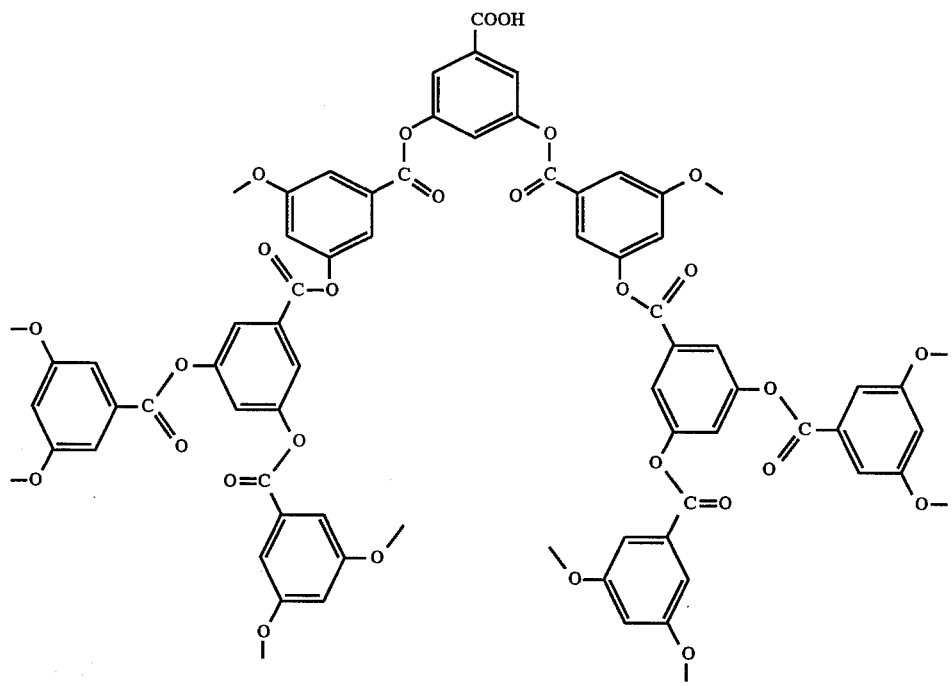

Hyperbranched Polymer

Upon further heating, the resulting hyperbranched polymer decomposes and forms carbon-carbon bonds between the phenyl rings of the starting monomers. As the temperature increases up to, for example, 500°–700° C., the six carbon phenyl rings start to break and form a layered carbon network. The formation of hyperbranched carbon polymers in the first stage of the process results in moving the monomer molecules physically closer to one another, thus facilitating carbonization in the second step of the process. This also accounts, at least partially, for improved yields as compared to the prior art. Further, and as described hereinabove, when the reaction is carried out in the presence of an acid, the acid catalyzes the ester reduction reaction and hence causes an improved yield of the final product. The second stage of the process may be best understood from the reaction illustrated in the following formula:

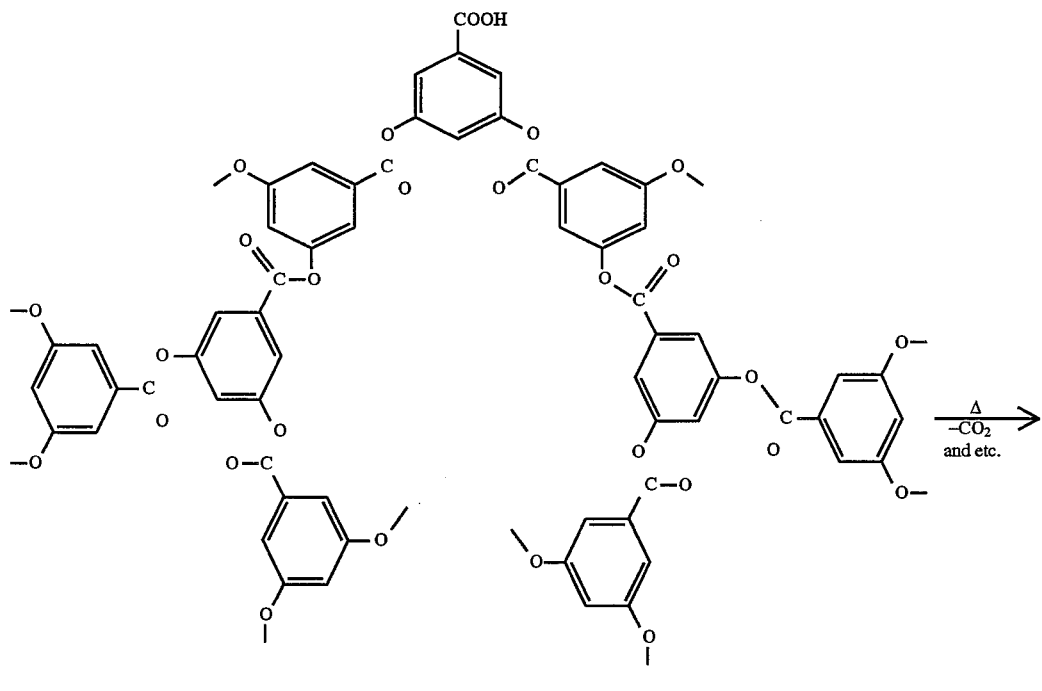

Hyperbranched Polymer

Amorphous Carbon

Figure 2:
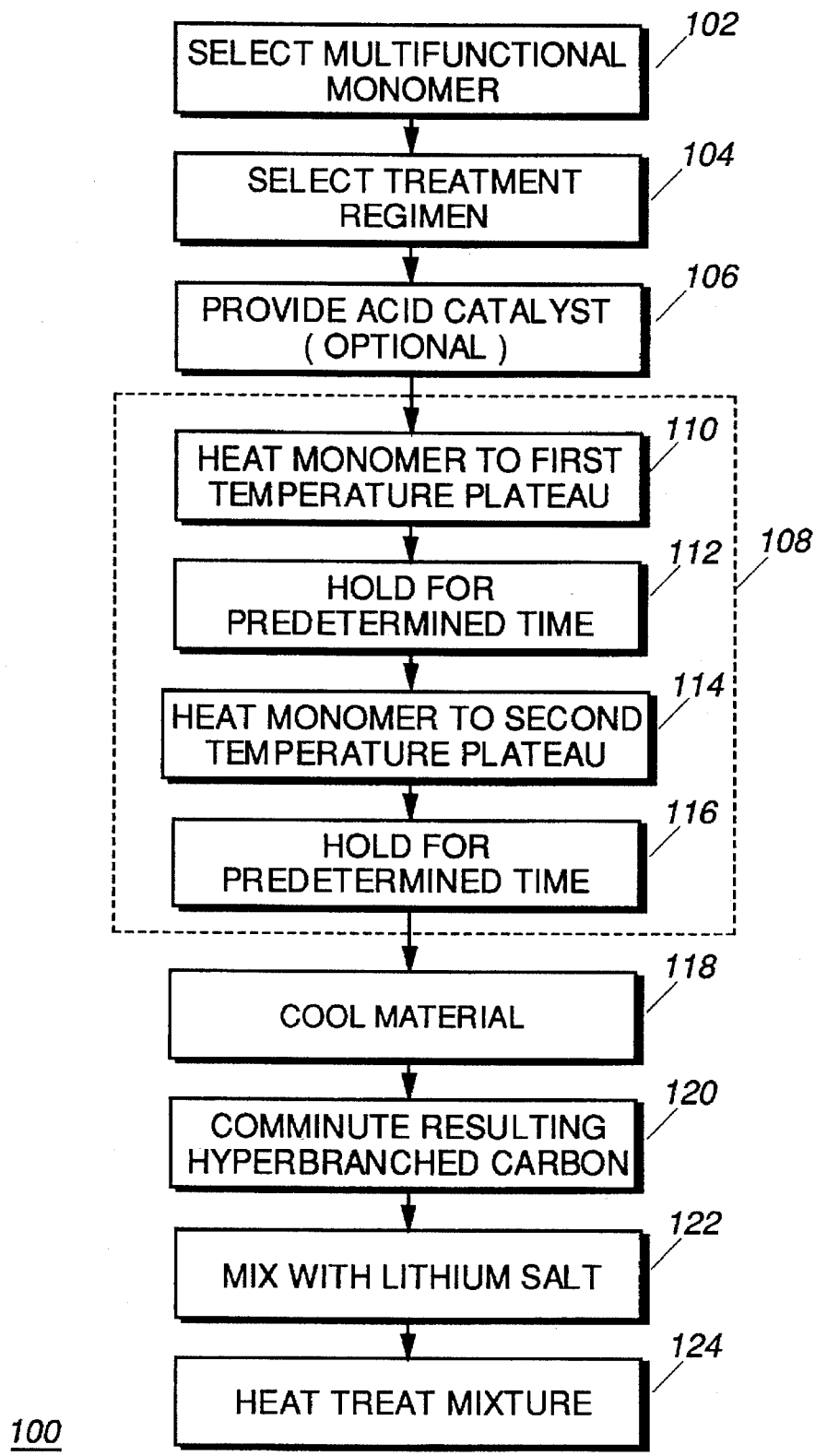
FIG. 2 is a flowchart illustrating the steps for preparing an amorphous carbon material in accordance with the instant invention.

Referring now to FIG. 2, there is illustrated therein a flow chart 100 describing the steps for preparing the amorphous carbon material described above. The first step illustrated in FIG. 2 is shown in box 102, and comprises the step of selecting an appropriate multi-functional organic monomer as described above. Thereafter, as illustrated in box 104, is the step of selecting the treatment temperature ranges for the solid state carbonization process for the selected monomer. More particularly, the yield of the amorphous carbon material from a particular multi-functional monomer will depend in large part on the thermal regime to which the monomer is subjected. Thermogravimetric analysis (TGA) and differential scanning calorimetry (DSC) each provide an excellent means by which to predetermine the processing temperature regime. The results have generally indicated that the solid state carbonization process should be a two temperature, one-step heating process.

Specifically, TGA & DSC indicate of the temperature at which condensation and reduction of the multi-functional monomers occur. Hence, using such analysis as described in commonly assigned, copending application Ser. No. 08/534, 427, referred to above, a heating regime is selected. For α-resorcyclic acid heating occurs to a first plateau at about 240° C., and then to a second plateau at about 600° C.

Returning now to FIG. 2, the next step in the fabrication process of flow chart 100 is illustrated in box 106, and comprises the step of mixing the multi-functional organic monomer with an acid selected from the group of acids described above. The two materials should be mixed thoroughly, and further may be dried, as in a drying oven, prior to subjecting the mixture to the solid state carbonization process. It is to be noted that the acid catalyst provides improved yield of the final product, but is not necessary to carry out the reaction. Further, as noted above, the acid is believed to catalyze the ester condensation reaction. Hence, if the starting multi-functional monomers contain no esters, the acid may not be required.

The next step illustrated in FIG. 2 is the solid state carbonization process 108, which may comprise a multi-step heating regime. As illustrated in FIG. 2, step 108 actually comprises four steps illustrated by boxes 110, 112, 114, and 116. Each step in the carbonization process will depend upon the DSC and TGA testing described above. Generally however, the step illustrated by box 110 comprises the step of heating the dried monomer/acid mixture to a first temperature at a predetermined rate of $X°$ C./minute. Once the desired temperature is reached, the mixture is held at that temperature for a predetermined time period, as illustrated in box 112.

Thereafter, the material is heated to a second, typically higher temperature, at a rate of $X°$ C./minute, as illustrated in box 114. Once the second desired temperature is reached, the mixture is held at that temperature for a predetermined time period, as illustrated in box 116. After solid state carbonization is completed, the resulting amorphous carbon material is cooled slowly as illustrated in box 126. Cooling should be at an appropriate rate to assure that the material retains its substantially amorphous character.

Following cooling as illustrated in Box 118, the resulting hyperbranched carbon material is subjected to a secondary treatment. The secondary treatment comprises the steps of comminuting the resulting hyperbranched carbon material to a particle size of approximately less than 100 μm, and preferably between 5 and 50 μm. Comminution may be carried out via conventional grinding techniques as are well known to those of ordinary skill in the art. This step is illustrated in Box 120 of FIG. 2. Thereafter, the comminuted hyperbranched carbon material is mixed with a lithium-containing component or lithium salt selected from the group consisting of $LiNO_3$, $Li_3PO_4$, $LiOH$, $Li_2SO_4$, $Li_2CO_3$, lithium acetate, and combinations thereof. In a preferred embodiment, the step of mixing comminuted hyperbranched carbon with a lithium salt comprises the step of mixing the hyperbranched carbon with $LiNO_3$. This step is illustrated in Box 122 of FIG. 2. Thereafter, the mixture of comminuted hyperbranched carbon and lithium salt is subjected to a heat treatment process. This step is illustrated in Box 124 of FIG. 2, and comprises heating the mixer at temperatures between 500° C. and 1200° and preferably between 600° C. and 800° C. In a most preferred embodiment, the temperature is approximately 700° C. The period of time for this heat treatment is between 8 and 20 hours, with 12 hours being used most commonly. The heat treatment process itself is necessary in order to modify the surface of the carbon material. It is well known that lithium ion type cell s which use carbon as the negative electrode active material suffer from significant first cycle capacity loss, which loss has been attributed to undesirable reaction within the carbon surfaces. Surface modification, as in the present invention, alleviates the capacity loss problem and thus helps to improve on first cycle charge efficiency of carbon materials when used as the active material in the negative electrode of lithium ion type cells. It is hypothesized that the improvement in first cycle charge efficiency results from the combination of hydrogen atoms released from the surface of the carbon material which bond to the associated lithiated salt. For example, hydrogen would bond to $NO_3$, forming $HNO_3$. The lithium would then be free to intercalate into the carbon material as well.

The instant invention may be better understood from the examples provided below.

EXAMPLES

Example I

Electrode films using the treated hyperbranched carbons prepared according to the method illustrated in FIG. 2, were prepared by mixing the hyperbranched carbon resulting from α-resorcyclic acid processed according to the instant invention. More specifically, α-resorcyclic acid was heated to a first temperature plateau of approximately 220° C. and to a second temperature plateau of approximately 600° C. in the presence of an acid. A second sample of α-resorcyclic acid was heated to a first temperature plateau of approximately 250° C. and on to a second temperature plateau of approximately 500° C. Thereafter, the material was treated with a lithium salt, specifically $LiNO_3$, at 700° C.

Electrode films were then prepared with 5% polytetrafluorethylene as a binder, by continuous pressing. The thickness of the electrode films was in the range of about 80 microns with active mass of approximately 6-8 mg per $cm^2$. Electrochemical data were obtained via a three-cell electrode with hyperbranched carbon as the cathode, metallic lithium as both the anode and reference electrode, and an electrolyte consisting of 1M $LiPF_6$ material in a mixture of ethylene carbonate (40 volume percent), dimethylcarbonate (40 volume percent) and diethylcarbonate (20 volume percent). The cells were assembled in an argon filled glove box.

Figure 3:
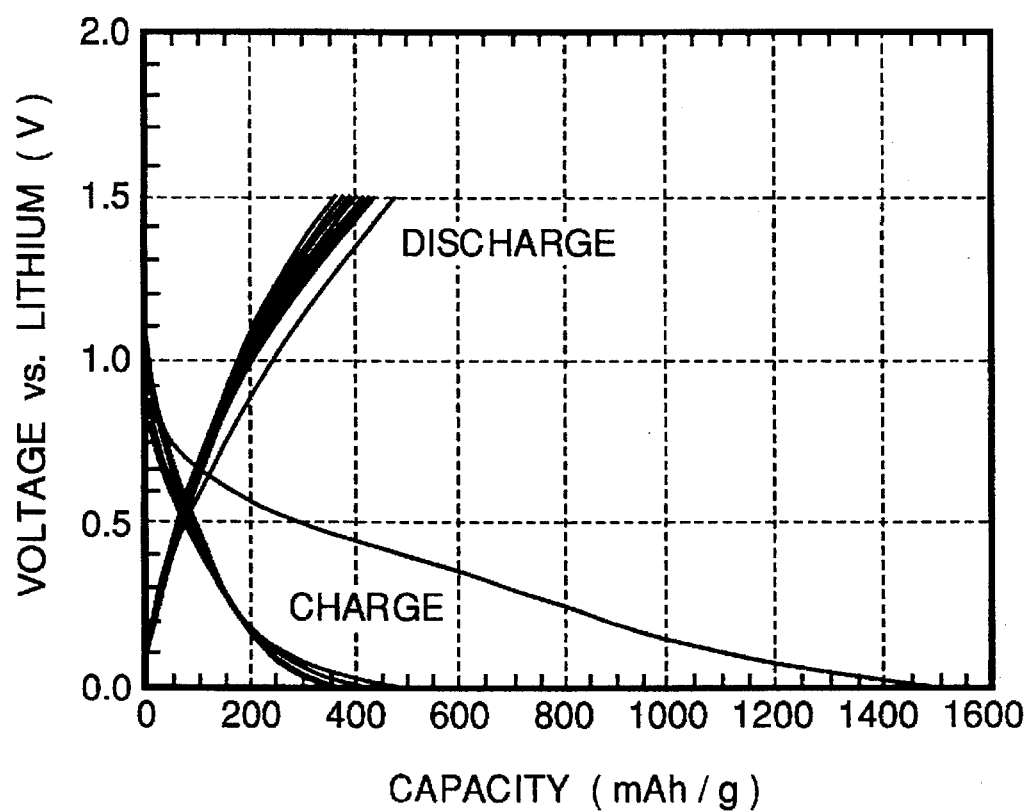
FIG. 3 is a series of charge/discharge curves for a carbon material prepared at 500° C. in accordance with the instant invention.
Figure 4:
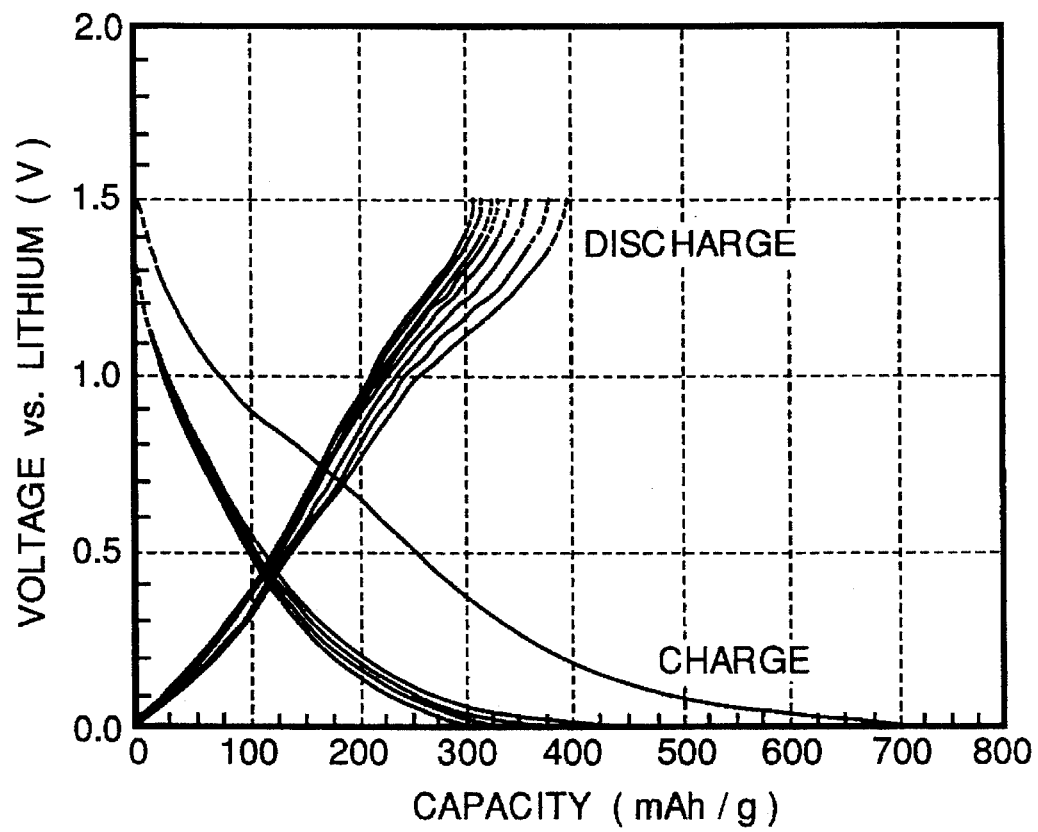
FIG. 4 is a series of charge/discharge curves for a hyperbranched carbon material prepared at 700° C., in accordance with the instant invention.
Figure 5:
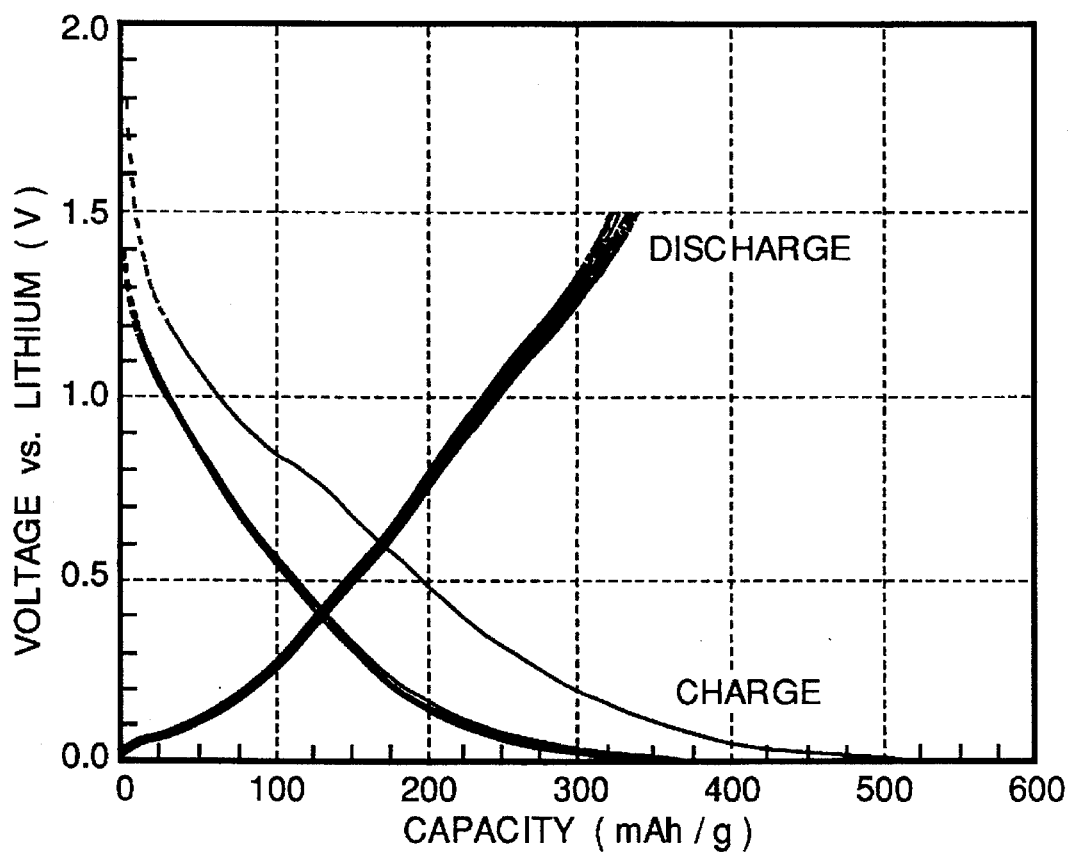
FIG. 5 is a series of charge/discharge curves of a hyperbranched carbon material prepared at 500° C. and treated with a lithium salt at 700° C. in accordance with the instant invention.

Referring now to FIGS. 3 and 4, there is illustrated therein the charge/discharge behavior of the hyperbranched carbon which were prepared at final treatment temperatures of 500° C. and 700° C. respectively, without addition of the lithium salt. Conversely, FIG. 5 illustrates the charge/discharge behavior of the hyperbranched carbon which was first prepared at 500° C., then treated with $LiNO_3$ at 700° C. A perusal of FIG. 5 shows that the first cycle charge capacity was approximately 510 milliamps per hour per gram (mAh/g), with a reversal discharge capacity of 335 mAh/g. This is equivalent only if first cycle loss of 34%. Referring back to FIGS. 3 and 4, the corresponding first cycle charge capacities are 1475 and 720 mAh/g respectively, with discharge capacities of 475 and 400 mAh/g. The corresponding first cycle losses are thus 68% and 45% respectively. Thus, the surface treatment resulted in carbon products with improved first cycle efficiency. The implication of this is that when used as the negative component in an electrochemical cell, a lower amount of active material will have to be used in the positive electrode to compensate for this initial loss of capacity. The resulting consequence is a cell with improved gravimetric energy density.

An additional benefit may be discerned by comparing the discharge profiles of FIGS. 3–5. Specifically, it is clear that the capacity fade and the discharge profiles is higher in FIGS. 3 and 4 (untreated carbon prepared at 500° and 700° C.) then in FIG. 5. Specifically, capacity fade is 26% in FIG. 3, 23% in FIG. 4, and only 5% in FIG. 5. Hence, the secondary surface treatment has resulted in materials with better cycling characteristics. Cells employing the treated materials would therefore have much better cycle life performance.

Example II

A second test cell was fabricated accordingly to this invention in a coin cell configuration with hyperbranched carbon as the anode and $LiCoO_2$ as the cathode. The electrolyte was as that described hereinabove with respect to FIG. 1, with glass mat used as the separator. There was approximately 13.0 mg of active anode material and 31.8 mg of active cathode material. The area of the electrodes in this Example II was about 1.5 cm². The coin cell was cycled between 2.5 and 4.2 volts with a current of 0.4 milliamperes.

Figure 6:
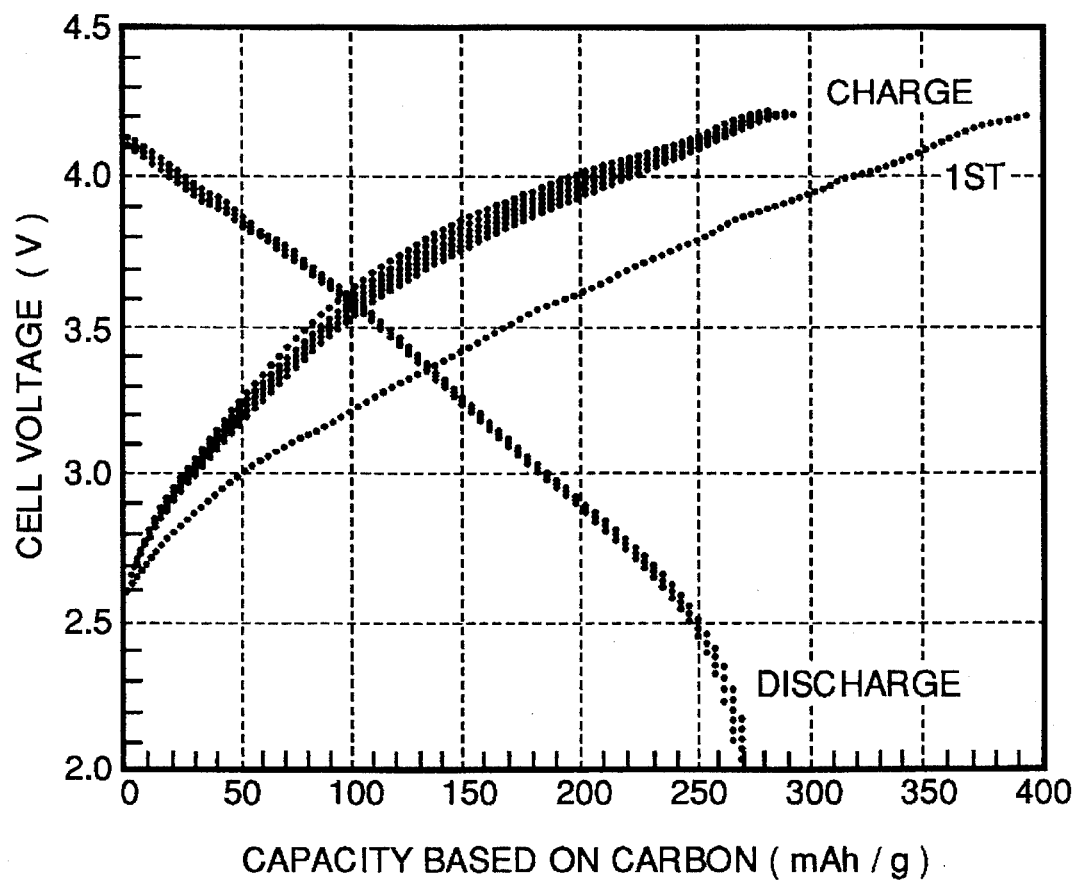
FIG. 6 is a series of charge/discharge cycles for an electrochemical cell incorporating a carbon electrode in accordance with the instant invention.

Referring now to FIG. 6, there is illustrated therein the first ten charge/discharge cycles of the coin cell described in this Example II. Based on active anode material, lithium intercalation capacity of the hyperbranched carbon was calculated to be approximately 270 milliamperes per gram. FIG. 6 thus illustrates that a full conventional cell can be assembled and manufactured with modified carbon of the present invention. The cell is capable of charge/discharge cycling without considerable loss in capacity as experienced in the prior art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of fabricating an amorphous carbon material for use as an electrode in a rechargeable electrochemical cell, said method comprising the steps of:

providing a multi-functional organic monomer having the structure

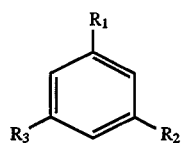

wherein $R_1$, $R_2$, and $R_3$ are all selected from the group consisting of carboxylic acids of eight carbons or less, carboxylic esters of eight carbons or less, alcohols of eight carbons or less, carboxylic anhydrides of eight carbons or less, amines, and combinations thereof, and wherein at least one of $R_1$, $R_2$, and $R_3$ is different than the others;

mixing said multi-functional organic monomer with operative amounts of an acidic catalyst;

subjecting said mixture to a solid state carbonization process in an inert environment; comminuting the amorphous carbon material; and heating said comminuting amorphous carbon material in the presence of a lithium-containing compound.

2. A method as in claim 1, wherein said multi-functional organic monomer is selected from the group consisting of 5-hydroxyisophthalic acid, 5-aminoisophthalic acid, α-resorcyclic acid, β-resorcyclic acid, δ-resorcyclic acid, gentisic acid, protocatechuic acid, and combinations thereof.

3. A method as in claim 1, wherein the weight percentage of said acidic catalyst is between 1 and 25%.

4. A method as in claim 1, wherein said acidic catalyst is selected from the group consisting of acetic acid, boric acid, phosphoric acid, p-toluenesulfonic acid, 4-amino benzoic acid, trifluoroacetic acid, and combinations thereof.

5. A method as in claim 1, wherein said inert environment is selected from the group consisting of nitrogen, helium, and argon.

6. A method as in claim 1, wherein said multi-functional organic monomer is α-resorcyclic acid.

7. A method as in claim 1, wherein said lithium-containing compound is selected from the group consisting of $LiNO_3$, $Li_3PO_4$, $LiOH$, $Li_2SO_4$, $Li_2CO_3$, lithium acetate, and combinations thereof.

8. A method as in claim 1, wherein said organic monomer is comminuted to a particle size of between about 5 μm to 100 μm.

9. A method of fabricating an amorphous carbon material for use as an electrode in an electrochemical device, said method comprising the steps of:

Providing a multi-functional organic monomer having the structure:

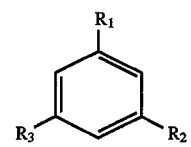

wherein $R_1$, $R_2$, and $R_3$ are each a functional group, and are all selected from the group consisting of carboxylic acids of eight carbons or less, carboxylic esters of eight carbons or less, alcohols of eight carbons or less, carboxylic anhydrides of eight carbons or less, amines, and combinations thereof, and wherein at least one of $R_1$, $R_2$, and $R_3$ is different than the others;

mixing said multi-functional organic monomer with operative amounts of an acidic catalyst;

subjecting said mixture to a solid state carbonization process in an inert environmental, wherein said solid state carbonation process includes the step of heating said multi-functional organic monomers to a first temperature sufficient to condense said functional groups and heating said condensed multi-functional organic monomers to a second temperature sufficient to polymerize said monomers;

comminuting the polymerized monomer; and heating the comminuting, polymerized monomer in the presence of a lithium containing compound selected from the group consisting of $LiNO_3$, $Li_3PO_4$, $LiOH$, $Li_2SO_4$, $Li_2CO_3$, lithium acetate, and combinations thereof.

10. A method as in claim 9, wherein said acidic catalyst is selected from the group consisting of acetic acid, boric acid, phosphoric acid, p-toluenesulfonic acid, 4-amino benzoic acid, trifluoroacetic acid, and combinations thereof.

11. A method as in claim 9, wherein the weight percentage of said acidic catalyst is between 1 and 25%.

12. A method as in claim 9, wherein said multi-functional organic monomer is selected from the group consisting of 5-hydroxyisophthalic acid, 5-aminoisophthalic acid, α-resorcyclic acid, β-resorcyclic acid, δ-resorcyclic acid, gentisic acid, protocatechuic acid, and combinations thereof.

13. A method as in claim 9, wherein said multi-functional organic monomer is α-resorcyclic acid.

14. A method as in claim 9, including the further step of heating said multi-functional organic monomers in an inert environment.

15. A method as in claim 14, wherein said inert environment is selected from the group consisting of nitrogen, helium and argon.

* * * * *